United States Patent [19]
Lebowitz

[11] Patent Number: 5,454,024
[45] Date of Patent: * Sep. 26, 1995

[54] CELLULAR DIGITAL PACKET DATA (CDPD) NETWORK TRANSMISSION SYSTEM INCORPORATING CELLULAR LINK INTEGRITY MONITORING

[76] Inventor: Mayer M. Lebowitz, 5515 Northaven Rd., Dallas, Tex. 75229

[*] Notice: The portion of the term of this patent subsequent to Jun. 23, 2009 has been disclaimed.

[21] Appl. No.: 196,979

[22] Filed: Feb. 15, 1994

Related U.S. Application Data

[63] Continuation-in-part of Ser. No. 897,700, Jun. 12, 1992, Pat. No. 5,327,478, which is a continuation-in-part of Ser. No. 486,425, Feb. 28, 1990, Pat. No. 5,125,021, which is a continuation-in-part of Ser. No. 401,651, Aug. 31, 1989, Pat. No. 5,146,486.

[51] Int. Cl.$^6$ .................................................. H04M 11/00
[52] U.S. Cl. ........................... 379/40; 379/39; 379/42; 379/59
[58] Field of Search ...................... 379/40, 39, 59, 379/60, 58, 33, 38, 41, 42, 43, 44, 50, 51

[56] References Cited

U.S. PATENT DOCUMENTS

| | | | |
|---|---|---|---|
| 4,577,182 | 3/1986 | Millsap et al. | 379/59 |
| 4,697,281 | 9/1987 | O'Sullivan | 455/33 |
| 4,718,079 | 1/1988 | Rabito | 379/39 |
| 4,742,336 | 5/1988 | Hall | 379/40 |
| 4,856,047 | 8/1989 | Saunders | 379/40 |
| 4,868,859 | 9/1989 | Sheffer | 379/39 |
| 4,887,290 | 12/1989 | Dop et al. | 379/40 |
| 4,972,455 | 11/1990 | Phillips et al. | 379/59 |
| 4,993,059 | 2/1991 | Smith et al. | 379/59 |
| 5,125,021 | 6/1992 | Lebowitz | 379/40 |
| 5,128,979 | 7/1992 | Reich et al. | 379/40 |
| 5,134,644 | 7/1992 | Gavton et al. | 379/39 |

Primary Examiner—Curtis Kuntz
Assistant Examiner—Stella L. Woo
Attorney, Agent, or Firm—David H. Judson

[57] ABSTRACT

A system for transmitting data between a subscriber site and at least one monitoring station, comprising a sensor circuit for generating data responsive to an event at the subscriber site, a first transmission circuit responsive to said sensor circuit and being operable to transmit data in packet form from the subscriber site to the monitoring station over a cellular digital packet data telecommunications network, a second transmission circuit responsive to said sensor circuit and being operable to transmit data from the subscriber site to the monitoring station over a second telecommunications network. A fault detect circuit is coupled to the first transmission circuit for continuously monitoring the operation of the first transmission circuit and the integrity of the cellular digital packet data telecommunications network. A control switch is coupled to the fault detect circuit and controlled thereby for automatically creating a signal path between the sensor circuit and the second transmission circuit.

6 Claims, 4 Drawing Sheets

CELLULAR DIGITAL PACKET DATA (CDPD) NETWORK TRANSMISSION SYSTEM INCORPORATING CELLULAR LINK INTEGRITY MONITORING

RELATED APPLICATIONS

The present application is a continuation-in-part of prior application Ser. No. 07/897,700, filed on Jun. 12, 1992, now U.S. Pat. No. 5,327,478, which application was a continuation-in-part of Ser. No. 07/486,425, filed on Feb. 28, 1990, now U.S. Pat. No. 5,125,021, which application was a continuation-in-part of Ser. No. 07/401,651, filed on Aug. 31, 1989, now U.S. Pat. No. 5,146,486. The disclosures of these prior applications are incorporated herein by reference.

TECHNICAL FIELD

The present invention relates to the general art of telecommunications, and to the particular field of over-the-air or cellular data telecommunications especially for use with premises or other remote monitoring equipment.

BACKGROUND OF THE INVENTION

There are many situations in which remote monitoring of various conditions is desirable. For example, up-to-the minute status of high voltage feeder circuit breakers in electrical substations have been monitored in a remote manner, as well as other state conditions sensors, such as pressure, temperature, liquid level and the like, intrusion sensors are often monitored in a remote manner as are smoke detectors. Recently, medical information and even the location of a person have been monitored in a remote manner.

In the past, such remote monitoring equipment has used land line communication between the monitoring equipment and the monitoring station. However, such land line communication links can be subject to several drawbacks. For example, in severe weather conditions or in wet climates, the land lines may be damaged by weather conditions or water. Such damage may degrade the link to such an extent that data transmitted over such link, if transmission is not totally interrupted, may become unreliable. Furthermore, land line communications may be subject to being deliberately interrupted by an intruder.

To overcome such problems, there have been several proposals in the art for including a radio link as a backup to a land line link. Such systems use the land line link if it is available, and switch to the radio link if the land line link is not operative.

While somewhat successful in avoiding the problems associated with a link consisting only of a land line, such land line/radio link systems still have certain drawbacks. For example, a radio link may not permit a system integrity check and there may not be a good method of determining the integrity of the link and ensuring that the monitoring station is on line with the subscriber premises station at all times. If, for example, the antenna at the subscriber station has been damaged, the link may not be properly established, and radio links may not be able to monitor such condition. Many radio link repeater site stations may be open and accessible to many people and thus may be subject to tampering.

Further, many such links may require a "push-to-talk" communication system which restricts the use of supervisory methods which monitor system operation and reliability. While some radio systems may include a polling feature that includes a periodic transmission permitting the receiver and the transmitter to communicate with each other, such polling is only done on a periodic basis and may still not ensure an entirely reliable system. A constant monitoring of the system integrity should be used to ensure full system reliability.

Still another problem with using radio links is that several repeater stations may be required in addition to a base station to cover a prescribed area. Additionally, the radio transmitters at the subscriber premises may be restricted to low power outputs and may be able to communicate only within a certain geographic area and report to only one receiver site having no redundancy. Furthermore, if a repeater station fails, incoming signals may be lost.

Still further, radio transmits may be restricted in the number of radio channels that can be used in a particular geographic area. This may require subscribers to share channels, and create a potentially undesirable situation. Furthermore, if two or more radio transmitters key at the same time, it may be possible that no communication is received at the monitoring station. System overload is also possible with such systems.

Yet a further problem with radio links is the limited adaptability thereof. For example, radio links may not be amenable to use with premises monitoring equipment that includes the transmission of slow scan, freeze frame, or real time CCTV, or to use with supervisory monitoring equipment that might include computer controlled fault-monitoring equipment. More importantly, such systems may not be completely usable with a system that includes downloading of information from the monitoring station to the subscriber station. That is, it may not be possible to efficiently send all of the information and data signals that are necessary for efficiently monitoring a premises from the monitoring station to the subscriber station over such links.

Yet a further problem with such systems is inherent in the switching system itself. That is, as mentioned above, these systems attempt to communicate with the monitoring station via a land line, and if such land line is inoperative, will switch to a radio link. This requirement may make the integrity of the system dependent on the switching system. Should this system become damaged or inoperative, the entire system will become inoperative. It can even be possible to view the overall integrity of the overall system as being a function of the integrity of the switching system. The switching operation may, in some cases, interrupt the data signal and introduce a spike into the signal, and therefore, influence the content and reliability of such signal. In some circumstances, the data can be of such a character that the switching operation may affect such data.

Therefore, systems that use only a land line link between a subscriber station and a monitoring station have problems, and those systems that include a radio link backup and switch to that radio link if the land line link is inoperative also have several restrictions and drawbacks.

The art also includes examples of premises-monitoring systems that include cellular link between the subscriber station and the monitoring station. While overcoming many of the problems associated with land line links and radio links alone, such cellular links still have certain drawbacks. For example, systems using a cellular link exclusively do not have a failsafe capability of a back-up system. If, for some reason, the cellular link is damaged or destroyed, those systems which rely on the cellular link for the exclusive means of establishing communicating between the subscriber station and the monitoring station can be rendered inoperative.

Such systems have been enhanced according to the teachings of U.S. Pat. Nos. 5,125,021 and 5,146,486, which are commonly-owned by the owner of this application. Such patents describe a premises-monitoring system which includes a cellular link between the subscriber station and the monitoring station and that has a very high level of integrity. These systems provide the further advantage of having the ability to cover a large geographic area that can include several monitoring stations with a multiplicity of frequencies and are amenable to a wide variety of monitoring elements.

In preferred embodiments of such systems, a premises-monitoring system is provided which includes a primary communication link between a subscriber's premises and a monitoring station. The primary communication link is preferably a cellular link. According to those patents, a fault means is provided for constantly monitoring the integrity of the cellular communication link and switching to a second telecommunications network if the cellular communication link is not operating properly. Such means can effect the switch before the monitoring equipment transmits an alarm signal thereby maintaining a link between the subscriber station and the monitoring station that is operative before any alarm data signal is sent from the subscriber station premises-monitoring equipment. Data can be sent both ways over both the primary and the secondary communication links at all times so that constant communication can be established and maintained at all times. Typically, the backup link is a radio telecommunications network, a land line telecommunications network, a fiber optic telecommunications network, a satellite direct network, or a long range radio telecommunications network.

According to such patents, the integrity monitoring means typically includes an electromechanical device that is activated by a "service/no-service" electronic signal on the electronic bus of a cellular transceiver device. The device monitors the integrity of the host cellular transceiver as well as the associated cell sites the host transceiver communicates with. Another feature of such systems is the ability to adapt a single line output alarm control panel for use therein.

While such systems provide distinct advantages over the prior art, there remains a need to enhance such techniques and to interface such systems to technological advances in the cellular data transmission industry.

BRIEF SUMMARY OF THE INVENTION

It is a primary object of the present invention to provide a cellular network premises monitoring system of the type generally described above that incorporates cellular digital packet data (CDPD) transmission.

It is a further object of the invention to provide a cellular network CDPD network transmission system incorporating cellular link integrity monitoring, preferably through use of an RF fault module.

It is more specific object of the invention to provide a premises or alarm monitoring system incorporating cellular link integrity monitoring in conjunction with a primary CDPD communication network link. A fault means is provided for constantly monitoring the integrity of the cellular link and switching to a second telecommunications network if the cellular communication link is not operating properly, irrespective of the existence of an alarm condition.

It is thus a further object of the invention to constantly maintain a link between a subscriber station and a monitoring station, whether or not an alarm condition exists, with the link being provided via a CDPD communication system or a suitable back-up. Such back-up link may be a radio telecommunications network, a land line telecommunications network, a fiber optic telecommunications network, a satellite direct network, another CDPD network or a long range radio telecommunications network.

It is a further object of the invention to provide alarm and premises monitoring which is economical and reliable over large geographic areas.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

As used herein, cellular digital packet data (CDPD) refers to a known cellular industry standard for cellular data transmission developed by the regional Bell operating companies. The technical specifications for such CDPD systems are described in detail in the *Cellular Digital Packet Data System Specification*, Release 1.0, Jul. 19, 1993, which is incorporated herein by reference in its entirety.

Figure 1:
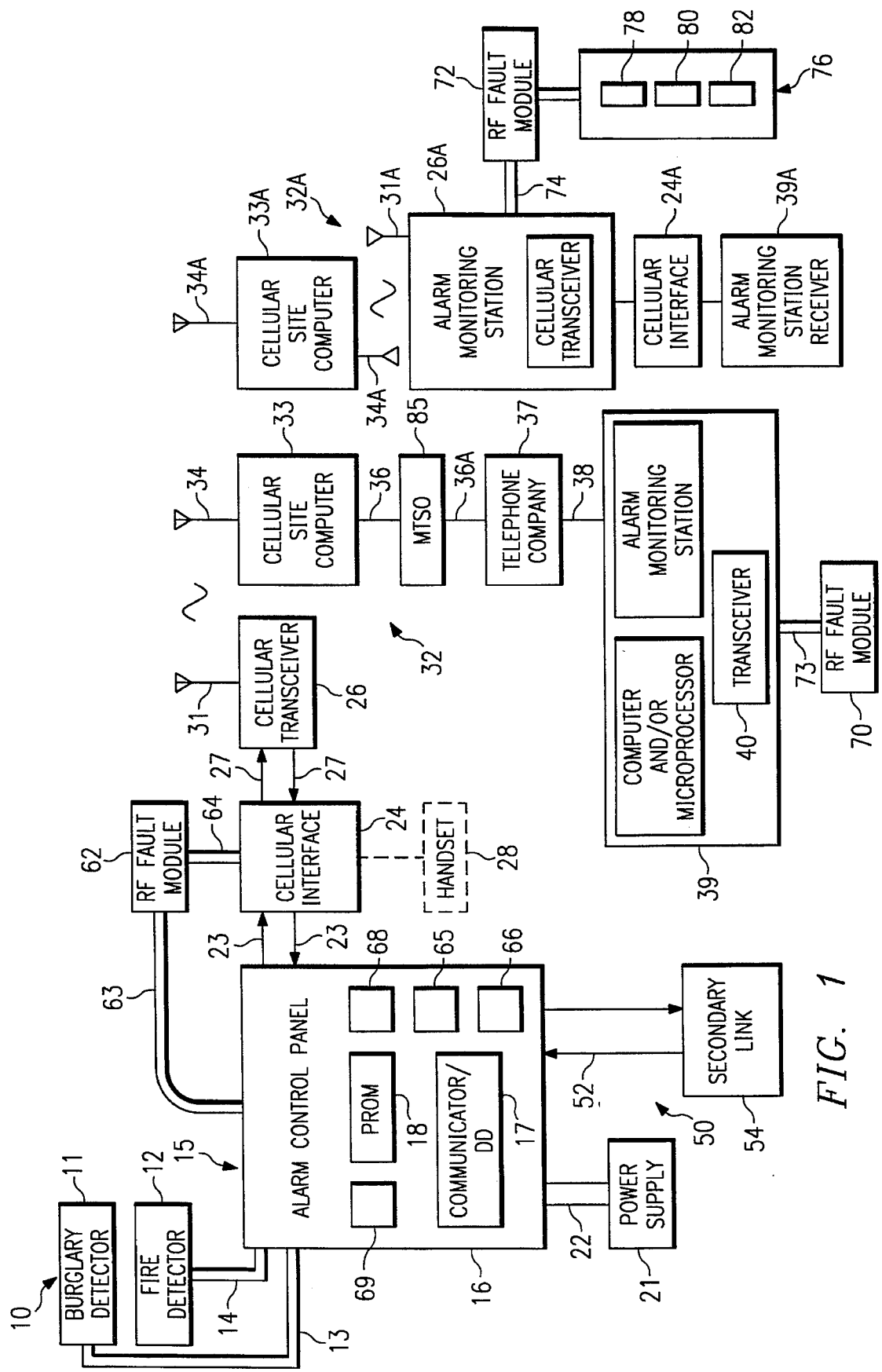
FIG. 1 illustrates by way of background an overall premises-monitoring using a cellular link as the primary communications link between a subscriber station and a monitoring station with a second telecommunications network as a backup communications link.

As shown in FIG. 1, in a known system sensor circuitry 10 located on a subscriber's premises can include a plurality of sensors, such as a burglar detection devices 11, a fire detection device 12, or the like located at various positions on the premises. As discussed in U.S. Pat. No. 4,825,457, for example, the disclosure of which is incorporated herein by reference, these sensors generate an electrical signal in response to the detected event, and such signals are conducted via conductors, such as conductors 13 and 14, to first transmission circuitry 15 which includes a digital communicator 16.

Alarm control panel 16 and communicator/digital dialer 17 and a programmable memory means such as a PROM 18. The PROM 18 is programmed with specific data such as the identification number of the site, account number, the emergency code (for fire, burglary, medical or the like), and the telephone number(s) of any alarm monitoring station(s) to be called as will be explained hereinafter. The PROM 18 can be removed and replaced as necessary and is connected to a suitable source of electrical power such as power supply 21 connected to the digital communicator/digital dialer via conductors, such as conductor 22.

The output of the alarm control panel 16 and communicator 17 is connected by means of conductors 23 to a cellular interface 24 which provides artificial dial and voltage to the communicator and digital dialer 17. Upon receiving the electronic signal (that comprises the telephone number to be dialed) from the digital dialer 17, that signal and an electronic "send" signal are then electronically entered into a transceiver 26 by means of conductors, such as conductor 27. The cellular interface 24 provides a path of communication between the communicator/digital dialer 17 and the cellular transceiver 26. A telephone handset 28 may also be connected to the interface 24. The transceiver 26 also includes an antenna 31 by means of which data may be transmitted over-the-air to a cellular network 32.

The cellular network 32 includes a plurality of cell sites, such as cell site 33 having a computer and an antenna 34 by means of which transmissions emanating from the transceiver antenna 31 are received. The cell site 33 is connected by telephone landlines, microwave link, or like means 36 to a Mobile Telephone Switching Office (MTSO) 83. The MTSO is connected via suitable link 36A to a commercial telephone company 37 which is connected to the monitoring station 39. If the digital dialer is calling a cellular telephone number at the monitoring station, the MTSO may be connected by microwave link to those cell site(s) that can communicate with the cellular transceiver at the monitoring station. The telephone company can also be connected by a suitable link 38 or via a cellular system to an alarm monitoring station 39. The alarm monitoring station is also provided with a computer and/or microprocessor and a transceiver 40.

The cellular link between the monitored premises and the monitoring station via the MTSO 83 is the primary communications link, and once a signal from one of the sensors is generated, such signal is transmitted to the alarm control panel 16. A telephone dialtone signal is provided to the communicator/digital dialer 17 from the cellular interface 24, and the communicator/digital dialer then transmits the telephone number of the alarm monitoring station 39 to the transceiver 26 via the interface 24 which sends this number over the cellular network 32 from antenna 31 to antenna 34. Of course, the signals are placed in a form that is appropriate for transmission over the selected link.

The telephone connection is made from the cellular network cell site 33 to the telephone company 37 to the alarm monitoring station 39. A "handshake" tone is sent back to the communicator/digital dialer 17 from the alarm monitoring station computer following which data appropriately stored in the PROM 18 is sent to the alarm monitoring station to complete the transmission of the emergency regarding the alarm condition. Communication is terminated by a "kiss-off" tone transmitted from the alarm monitoring station 39 via the transceiver 26 to the digital communicator, and proper notification of police, fire department, health care personnel or the like is accomplished by the alarm monitoring station.

The cellular network cell site 33 may, via its antenna 34, re-transmit the signal it receives from the subscriber's cellular transceiver 26 to another cellular network cell site 32A, to a cellular transceiver located at the central monitoring station 26A via antenna 31A to a cellular interface 24A, also at the central monitoring station 39A connected to a central monitoring station data processing computer. The alarm monitoring station 26A can also communicate with other stations via a cellular network if suitable.

The system thus far described can provide two-way communication between the monitoring station and the monitored premises as the microprocessor at the alarm monitoring station can "call up" the alarm system's digital communicator at the subscriber premises and obtain data therefrom. The alarm monitoring station can also send data to the subscriber station via the cellular network and thus the system is capable of uploading and downloading via the just-described cellular system. The alarm system can be used in conjunction with a variety of different premises monitoring sensors, such as listening devices, slow scan CCTV cameras and the like.

The system of FIG. 1 utilizes a secondary communication link as a back up to the above-described cellular communication link as well as fault monitoring equipment and switching equipment to determine the integrity of both links and to switch to the most reliable link. This back up system is shown in FIG. 1 as including a link 50 connected at one end to the subscriber digital communicator by conductors, such as conductor 52 and at the other end to the alarm monitoring station via a link 54. An RF fault module 62 is connected to the digital communicator 16 by conductors, such as conductor 63 and to the cellular interface by conductors, such as conductor 64, and continuously monitors the integrity of the cellular interface/transceiver and cell site(s) that the transceiver can communicate with. The system also includes selection circuitry 65 and switching circuitry 66 connected to the fault module as well as second transmission circuitry 68 that is adapted to transmit data over the secondary network. Such selection circuitry, switching circuitry and transmission circuitry are known in the art. A selection circuit 69 can also be included to select one of a plurality of monitoring stations in sequence as the destination for the transmissions of data and for prompting the transmission circuitries to transmit data to each of the plurality of monitoring stations.

In the event the cellular communications link is not operative, the switching circuitry is activated and data is sent via the link 50. As discussed above, the overall system can include several monitoring stations, and thus, the first and second transmission circuitry described above includes means for searching for a proper monitoring station over the particular communication link being used. That is, if the secondary link is being used, the selection circuitry is used to select the proper monitoring station via the secondary link, and if the cellular communication link is being used, the PROM is used to select the proper monitoring station via the cellular link. A long-range radio link or fiber optic telecommunications network are also suitable as the back up link.

The fault module and its associated signaling and operation details are fully discussed in U.S. Ser. No. 07/897,700, the disclosure of which is incorporated herein by reference. Such fault module is included in the communications system shown in FIG. 1. If any monitoring station is associated with a cellular network, that monitoring station can have an RF fault module associated therewith. For example, RF fault module 70 is associated with the station 39 and RF fault module 72 is associated with the station 26A. Each RF fault module is connected to the cellular interface and cellular transceiver of the associated station by conductors, such as conductors 73 and 74 respectively. Each fault module is connected to an alarm device, such as device 76 associated with the fault module 72 and which includes a visible indicator 78 and an audible indicator 80 to signal if an interface/transceiver fails at a central station, and includes its own power supply 82 that acts as a backup power supply to utility power.

The fault circuitry monitors the cellular communication links in a continuous manner as well as during an attempt to communicate using the links. Thus, the modules are used to monitor the integrity of the links when no alarm signals are being sent over the links and when the system is being used to communicate during an alarm situation. In this manner, the integrity of the system is constantly being checked and monitored.

If the alarm system is used during an alarm situation, or in the absence of an alarm situation, the various downloading, uploading, handshake and kiss-off signals are used to check the integrity of the alarm system.

Figure 2:
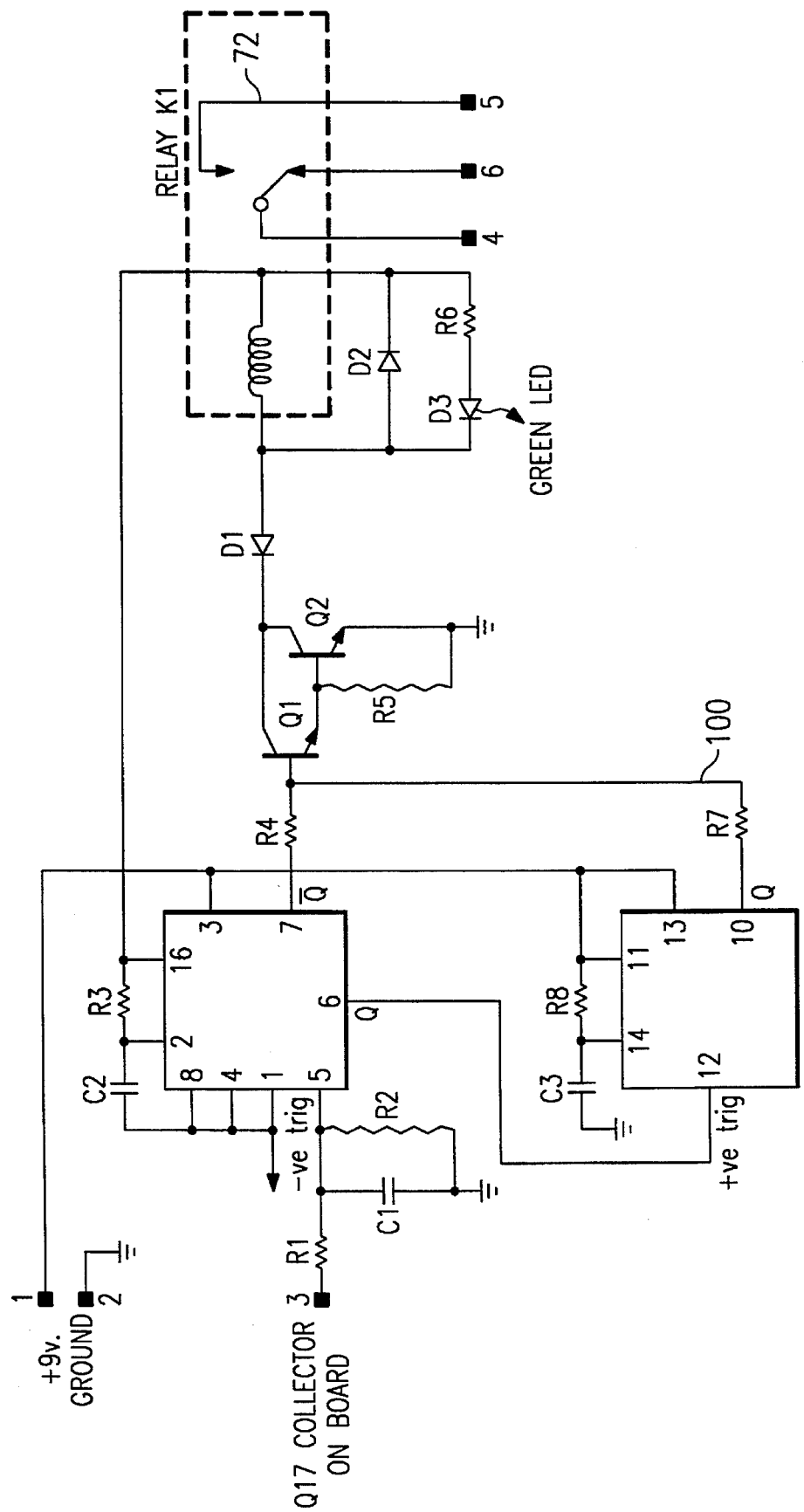
FIG. 2 is a circuit schematic illustrating an RF Fault Module used in conjunction with the premises-monitoring system of FIG. 1A.

The RF fault module is shown in FIG. 2. As shown in this figure, the circuit includes a green LED and a relay. The RF fault module electronically "reads" the integrity of the data link between the cellular transceiver located on the subscriber's premises and the cellular network cell site(s). If the RF data link "goes away" for any reason, the RF fault module de-energizes the green LED and the relay. The cellular interface preferably includes a red LED which glows steadily when the RF link is intact, and blinks when the RF data link is lost. The RF fault module electronically monitors the circuitry in the cellular transceiver that causes the red LED on the interface to function.

The output of the RF fault module is, preferably, wired directly to an alarm control panel to activate the digital dialer to call up the central station via the secondary link if the RF data link is lost and hence the cellular transceiver is not operating. Further structural and operating details of the RF fault module are provided in the above-described patents and applications, which are incorporated herein by reference.

To further ensure communication link integrity, the system may include a computer program on the cellular network computer. This program incorporates all of the cellular network telephone numbers with their corresponding electronic serial numbers (ESN) assigned to cellular transceivers used to transmit alarm conditions from subscriber premises to a central monitoring station as well as the cellular network telephone numbers and ESN's of cellular transceivers located at central monitoring stations for purposes of receiving alarm signals from various subscriber premises.

Using this software, the cellular network main computer constantly scans the entire local cellular network to ascertain that those particular cellular transceivers as "flagged" in the computer memory are indeed on line and operating. This is done using the software package to periodically interrogate each of the cellular transceivers being monitored by sending a signal to each of the cellular transceivers and requesting them to "test" their transceiver by sending a signal that would be recognized by the main cellular network computer. If the transmitted signal is not received from a certain cellular transmitter within an allotted time period, the main cellular network computer will recognize that particular cellular transceiver as not operable and will report that condition to the central station microprocessor digital receiver associated with that particular cellular transceiver that has failed to respond. That notified central station will then take appropriate action.

The method of operation of the fault monitoring system is evident from the foregoing. One of the alarm sensors generates a signal responsive to an event at the subscriber premises, and the system attempts to transmit appropriate data from the subscriber site to the monitoring station using the cellular telecommunication network. This data is conditionally transmitted over the backup communication link if the cellular link cannot be completed. The cellular network may include several telephone numbers at the same monitoring station or at several different monitoring stations, and the cellular network attempts to communicate with each of these numbers and/or stations in turn before switching to the backup link. The system also monitors the integrity of both links on a continuous basis so that a switch from one link to another can be effected before an alarm signal must be communicated. The RF fault modules are used to effect these integrity checks. The cellular link is typically checked by waiting an appropriate time period for the cellular link to be completed before switching either monitoring stations or switching to the backup link. The backup link is checked the same way. In this manner, the switching function will not be performed simultaneously with the data communication associated with the alarm functions. The system also monitors each alarm sensor to determine if it is in proper operating condition to further ensure the integrity of the overall system.

Figure 1A:
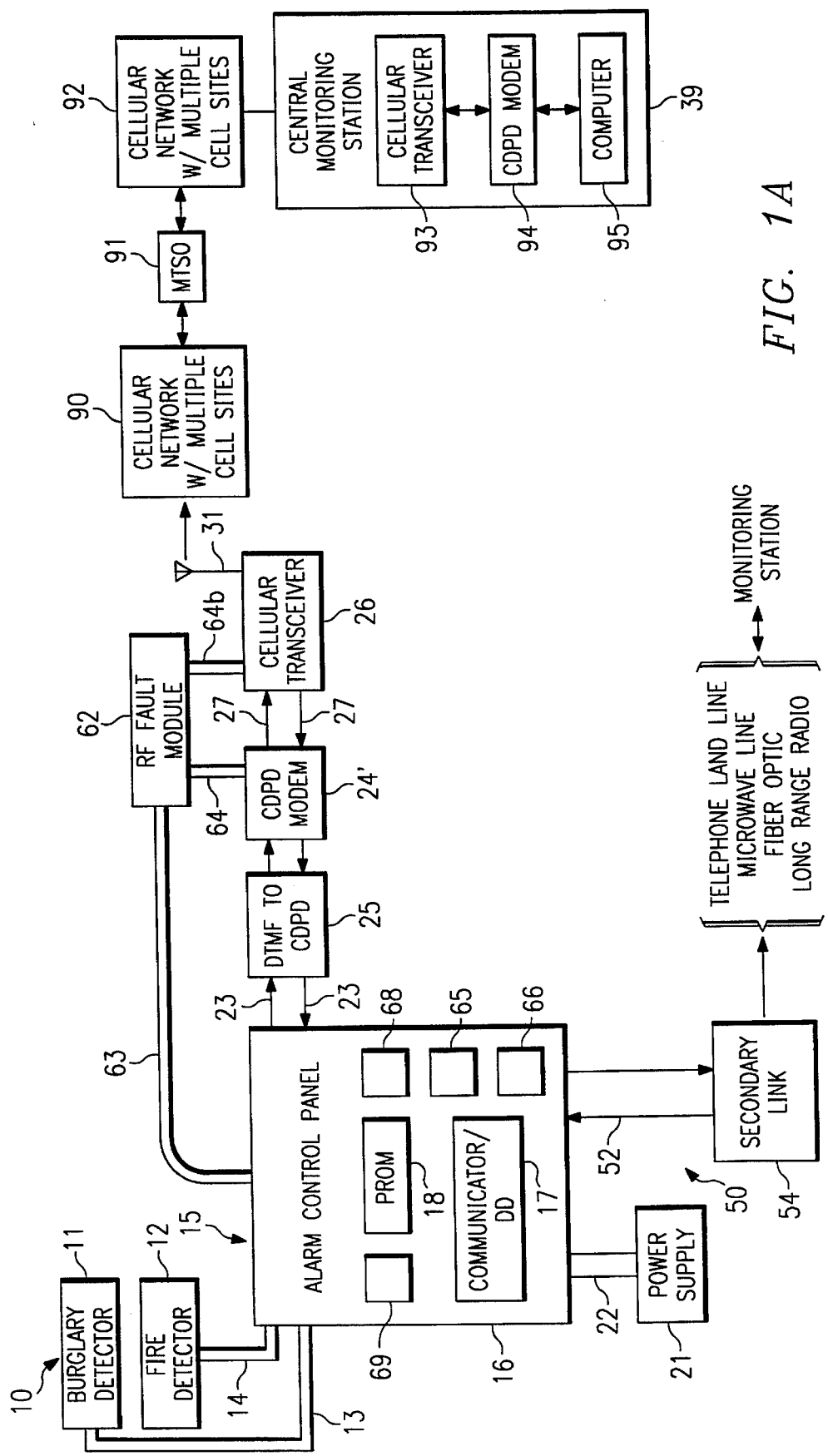
FIG. 1A is the preferred embodiment of the present invention wherein the primary communications link between the subscriber station and the monitoring station is effected over a CDPD transmission network.

Referring now to FIG. 1A, a preferred embodiment of the present invention is illustrated in detail. This embodiment is similar to that of FIG. 1 with the principal distinction being that the primary communications link provides CDPD functionality. Thus the primary link shown in FIG. 1A provides digital data transmission whereas the circuit of FIG. 1 transmit voice data. The primary link includes a cellular transceiver 26 connected to a CDPD modem 24'; these devices transmit and/or receive the packet data to/from the network in accordance with the CDPD protocol and operating standards set forth in the CDPD specifications referenced above. While FIG. 1A shows the use of a distinct CDPD interface and CDPD modem, it should be appreciated that these devices could be combined into a single unit or, alternatively, could be combined with the devices 24 and 26 of FIG. 1 such that the two systems comprise a single integrated system providing both voice and data transmission. The remaining portion of the primary link includes cellular networks (each preferably with multiple cell sites) 90 and 92 interconnected by the MTSO 91, and equipment located at the central monitoring station including a cellular transceiver 93, another CDPD modem 94 and the central station computer 95.

Sensor circuitry 10 located on the subscriber's premises includes a plurality of sensors, such as a burglar detection devices 11, a fire detection device 12, or the like. These sensors generate electrical signals in response to the detected events, and such signals are conducted via conductors, such as conductors 13 and 14, to first transmission circuitry 15 which includes the digital communicator/dialer 17 in the alarm control panel 16. A programmable memory means, such as a PROM 18, is programmed with specific data such as the identification number of the site, account number, the emergency code (for fire, burglary, medical or the like), and the telephone number(s) of any alarm monitoring station(s) to be called.

The output of the alarm control panel 16 and communicator 17 is connected by means of conductors 23 to a DTMF-to-CDPD convertor 25 and then through the CDPD modem 24' for interfacing the alarm control panel to the cellular transceiver 26. Upon receiving the electronic signal (that comprises the telephone number to be dialed) from the digital dialer 17, that signal is converted to CDPD format by convertor 25 and, along with an electronic "send" signal, provided to the CDPD modem. The modem then electronically enters the "dial" signals into the transceiver 26 by means of conductors, such as conductor 27. The CDPD modem thus provides a path of communication between the communicator/digital dialer 17 and the cellular transceiver 26.

As noted above, the cellular network 90 includes a plurality of cell sites, and a cell site may comprise a computer and an antenna by means of which transmissions emanating from the transceiver antenna are received. The cell site is connected by telephone landlines, microwave link, or like means to the MTSO 91. MTSO is connected via a suitable link to another cellular network 92 which is connected to the monitoring station 39. The alarm monitoring station has similar CDPD functionality (via transceiver and modem 93 and 94) to interface the CDPD signals and is further provided with a computer 95.

The CDPD cellular link between the monitored premises and the monitoring station via the MTSO 91 is the primary communications link, and once a signal from one of the sensors is generated, such signal is transmitted to the alarm control panel 16. A control signal is provided to the communicator/digital dialer 17 from the cellular interface, and the communicator/digital dialer then transmits the telephone number of the alarm monitoring station 39 to the transceiver 26 via the modem which sends this number (via a CDPD transmission) over the cellular networks to the station 39.

Cellular network cell sites within the networks 90 and 92 may, via antennas, re-transmit the signals they receive from the subscriber's cellular transceiver 26 to other locations or other monitoring stations. Of course, the central monitoring station 39 may be located in network 90.

The system of FIG. 1A also utilizes a secondary communication link as a back up to the above-described cellular communication link as well as fault monitoring equipment and switching equipment to determine the integrity of both links and to switch to the most reliable link. This back up system is shown in FIG. 1A as including the link 50 connected at one end to the subscriber digital communicator by conductors, such as conductor 52 and at the other end to the alarm monitoring station via a link 54. An RF fault module 62 is connected to the digital communicator 16 by conductors, such as conductor 63 and to either the CDPD modem or the cellular transceiver (or both) by conductors, such as conductors 64a and 64b, and continuously monitors the integrity of the cellular interface and cell site(s) that the transceiver can communicate with. The system also includes selection circuitry 65 and switching circuitry 66 connected to the fault module as well as second transmission circuitry 68 that is adapted to transmit data over the secondary network. The selection circuit 69 can also be included to select one of a plurality of monitoring stations in sequence as the destination for the transmissions of data and for prompting the transmission circuitries to transmit data to each of the plurality of monitoring stations.

In the event the cellular communications link is not operative, the switching circuitry is activated and data is sent via the link 50, which may be a telephone landline, microwave line, fiber optic network or long range radio transceiver.

Figure 3:
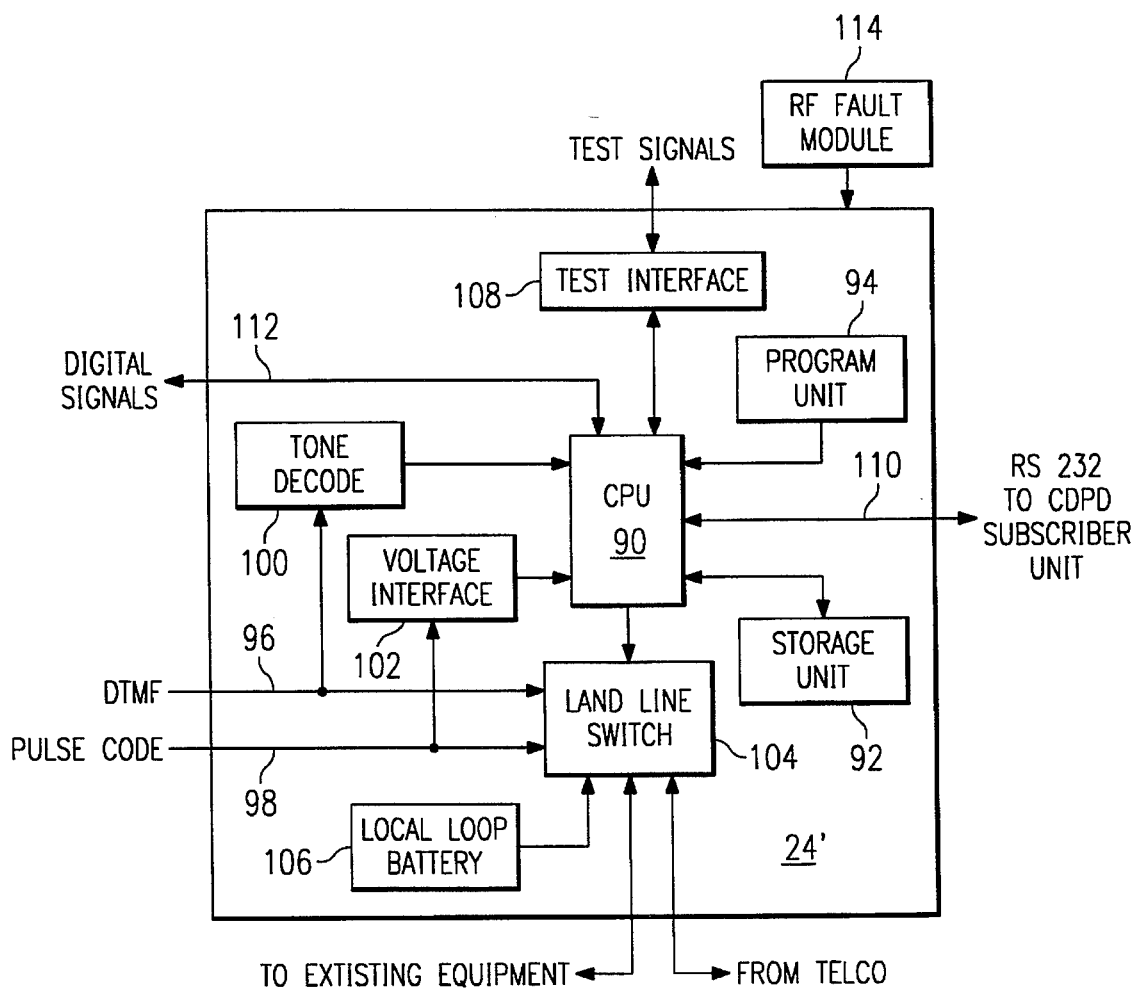
FIG. 3 is a detail of an CDPD alarm interface circuit for use in the system of FIG. 1.

A preferred embodiment of the CDPD interface 24' is shown in FIG. 3. The interface generally includes a number of functional components including a general purpose digital processor 90 having associated storage 92 and a computer program 94 to effect control of the interface. DTMF signaling from the premises is provided via conductor 96 to a tone decoder 100 which interfaces such signaling to the processor (thus forming interface 25 of FIG. 1A). Likewise, pulse code signaling from the premises is provided via conductor 98 to a voltage interface 102 which interfaces such signaling to the processor. The DTMF or pulse code signals are also provided to a land line switch 104 that interfaces the processor to secondary or back-up link. The land line switch 104 also connects to the local loop battery 106. A test interface 108 is provided connected to the processor to facilitate testing of the device. An RS232 connection 110 couples the interface to the CDPD modem 26a. Digital signals to and from the interface are provided via connector 112.

The RF fault detect circuitry 114 continuously monitors the service/no service condition of the modem. Alternatively, the modem has a service/no service indicator light which also is monitored by the RF fault detect circuitry. When a no service condition is sensed (either directly or from a change in the indicator), the CDPD interface generates an event signal that is provided via connector 112 back to the alarm control panel. This event signal activates the digital communicator to send the DTMF or pulse code dialing signal to the land line switch 104, which in turn is activated by the processor to transmit the event signal via the back-up link 50, thus calling attention to the loss of the CDPD link.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

I claim:

1. A system for transmitting data between a subscriber site, having a plurality of sensors associated therewith, and at least one monitoring station using first and second transmission circuits connected to first and second telecommunications networks, the first telecommunications network providing cellular digital packet data (CDPD) transmission, comprising:

fault detect circuit means coupled to the first transmission means for continuously monitoring the operation of the first transmission circuit and the integrity of the first telecommunications network; and control means coupled to the fault detect circuit means and controlled thereby for automatically creating a signal path between the sensors and the second transmission circuit upon loss of integrity of the CDPD network.

2. A system for transmitting data between a subscriber site and at least one monitoring station, comprising:

sensor circuit means for generating data responsive to an event at the subscriber site;

first transmission means responsive to said sensor circuit means and being operable to transmit data in packet form from the subscriber site to the monitoring station over a cellular digital packet data telecommunications network;

second transmission means responsive to said sensor circuit means and being operable to transmit data from the subscriber site to the monitoring station over a second telecommunications network;

fault detect circuit means coupled to said first transmission means for continuously monitoring the operation of the first transmission means and the integrity of the cellular digital packet data telecommunications network; and control means coupled to the fault detect circuit means and controlled thereby for automatically creating a signal path between the sensor circuit means and the second transmission means.

3. The system as described in claim 2 wherein the signal path between the sensor circuit means and the second transmission means is created upon loss of integrity of the cellular digital packet data telecommunications network.

4. The system as described in claim 2 wherein the signal path between the sensor circuit means and the second transmission means is created upon detection of a fault in the first transmission means.

5. The system as described in claim 2 wherein the first transmission means includes a cellular digital packet data (CDPD) modem.

6. The system as described in claim 2 wherein the second telecommunications network is a land line.

* * * * *